United States Patent [19]

Yavuz et al.

[11] Patent Number: 5,173,349

[45] Date of Patent: Dec. 22, 1992

[54] THERMAL SHOCK AND CREEP RESISTANT MULLITE ARTICLES PREPARED FROM TOPAZ AND PROCESS OF MANUFACTURE

[75] Inventors: Bulent O. Yavuz, Plainfield; Kenneth E. Voss, Somerville; Matthew P. Larkin, Phillipsburg, all of N.J.

[73] Assignee: Engelhard Corporation, Iselin, N.J.

[21] Appl. No.: 567,995

[22] Filed: Aug. 16, 1990

Related U.S. Application Data

[63] Continuation-in-part of Ser. No. 386,186, Jul. 28, 1989.

[51] Int. Cl.$^5$ .................... B32B 3/12; C04B 35/02
[52] U.S. Cl. .................... 428/116; 501/86; 501/95; 501/125; 501/128; 501/153; 501/154; 428/330; 428/331
[58] Field of Search .................... 501/95, 86, 125, 128, 501/153, 154; 428/113, 116, 304.4, 326, 330, 331, 328

[56] References Cited

U.S. PATENT DOCUMENTS

| | | | |
|---|---|---|---|
| 3,948,810 | 4/1976 | Hervert | 252/477 R |
| 4,304,585 | 12/1981 | Oda et al. | 65/43 |
| 4,585,500 | 4/1986 | Minjolle et al. | 156/89 |
| 4,910,172 | 3/1990 | Talmy et al. | 501/95 |
| 4,911,902 | 3/1990 | Talmy et al. | 423/328 |
| 4,948,766 | 8/1990 | Talmy et al. | 501/128 |

*Primary Examiner*—William R. Dixon, Jr.
*Assistant Examiner*—Michael Marcheschi

[57] ABSTRACT

A process for forming a shaped article comprised of mullite whiskers comprising the following steps:
a. preparing a mixture of aluminum fluoride and silicon dioxide in a weight ratio of about 7:3;
b. firing the mixture in air at a temperature above about 750° C. until complete conversion to topaz takes place;
c. mixing the topaz product of step (b) with silicon dioxide in a weight ratio of about 18:1 together with a binder and firing at a temperature of above about 1400° C. until complete conversion to mullite occurs.

20 Claims, 5 Drawing Sheets

THERMAL SHOCK AND CREEP RESISTANT MULLITE ARTICLES PREPARED FROM TOPAZ AND PROCESS OF MANUFACTURE

This application is a continuation-in-part of U.S. patent application Ser. No. 7-386186 filed Jul. 28, 1989.

Shaped ceramic articles which exhibit a high degree of thermal shock and creep resistance have a number of commercially important applications, for example, as diesel particulate traps, hot gas filters, molten metal filters, substrates for exhaust catalysts, catalytic substrates for ozone conversion, catalytic substrates for combustors used to power gas turbines and in metal matrix composites. Several major problems, however, hinder such uses of ceramics. First, ceramics are susceptible to damage, such as cracking, caused by thermal shock and/or creep. Other problems ceramics face in the recited applications are the result of the fact that ceramic structures frequently are difficult to machine or to join, making it difficult to manufacture ceramic articles having complex shapes.

The present invention utilizes the reaction of aluminum fluoride with silicon dioxide to produce crystalline mullite in the form of whiskers. According to the invention the reactants can be formed into the desired near net shape using a binder and then fired to produce the desired shaped articles.

In another embodiment of the invention, the aluminum fluoride and silicon dioxide reactants may be subject to a first reaction to form topaz whiskers. The topaz whiskers may then be mixed with silicon dioxide, or with a mixture of aluminum fluoride and silicon dioxide, and these reactants formed into the desired near net shape using a binder, and then fired to produce the desired shaped articles. The product will be composed of an interconnected whiskers network with porosity ranging from 15 to 85% depending on the ratio of AlF3 to topaz; the greater the proportion of topaz in the reactant mixture, the greater will be the density, and the lower will be the porosity, of the resulting mullite article.

Since articles made according to the invention contain interconnected mullite whiskers, they have surprising strength in spite of being porous. Such articles have utility in applications where high refractoriness, thermal shock and creep resistance are needed and, in addition, are easily machinable. Moreover, pieces of the green reactants demonstrate a unique ability to weld when fired. Since extrusion of large pieces, such as might be used for diesel particulate filters or catalytic combustors is quite difficult, the ability to join extruded green pieces of such products eases manufacture.

BACKGROUND OF THE INVENTION

Alumina chemically combined with 28.2% by weight silica in the general formula $3Al_2O_3.2SiO_2$ is a composition known as mullite. This composition exhibits a characteristic X-ray diffraction pattern, has many of the known valuable properties of alumina and, in addition, exhibits other valuable physical and chemical properties. When mullite is formed as whiskers, the unusual strength associated with single crystals is obtained.

Various methods have been suggested in the prior art for the production of mullite in whisker or fibrous form. For example, U.S. Pat. No. 3,104,943 discloses methods whereby mullite fibers of less than 5 microns in cross-sectional diameter and an axial ratio of at least 100 to 1 are produced. The process is a vapor-phase reaction at a temperature of from 800° C. to 1,200° C. in which silicon dioxide, aluminum, and aluminum combined with a source of sulfur are reacted in an atmosphere containing at least 1% hydrogen.

U.S. Pat. No. 3,023,115 discloses a process for the production of a composition of matter, in the form of discrete fibers consisting essentially of between 95% and 99% by weight alumina, and 1-5% by weight silica. The process of this invention comprises reacting a gaseous suboxide of aluminum with silicon monoxide vapors in a hydrogen atmosphere at a temperature of from about 1,370° C. to about 1,500° C.

U.S. Pat. No. 3,321,271 discloses a process for production of aluminum silicate whiskers in a vapor state reaction carried out at a temperature of from 1,000° C. to 1,400° C., while U.S. Patent 3,607,025 discloses a process by which an alkali metal halide and aluminum chloride are contacted with silica in the presence of an oxidizing gas at a temperature of from 1,000° C. to 1,350° C. to form silica deficient mullite fibers.

The formation of mullite fibers from the reaction of aluminum trifluoride and silicon dioxide was reported by D.A. Haught of the U.S. Navy Surface Weapons Research Center at a non-public meeting sponsored by the USACA and NASA in Cocoa Beach, Fla. in January 1988. Subsequently, on Mar. 20, 1990, U.S. Pat. No. 4,910,172 issued to Talmy and Haught. The Talmy et al patent is directed to a method of preparing mullite whiskers from AlF3, Al2O3 and fused silicon powders, wherein the reactants pass through a topaz crystal form, which crystals are heated in an SiF4 atmosphere to form the mullite whiskers. Talmy et al are also the listed inventors on PCT Published Application WO 90/01471, which claims priority based on U.S. application 229,517, filed Aug. 5, 1988. This PCT Publication is directed to processes for producing rigid mullite whisker felt for pre-forms and thermal insulators. Work involving the manufacture of crystals according to this route has also been conducted by Suvorov and others at the Leningrad Technical Institute. Prior to the present invention, however, this reaction of aluminum fluoride with silica held together with a binder, has not been employed to form complex-shaped articles, such as catalyst supports which should be fluoride-free.

SUMMARY OF THE INVENTION

This invention is directed to a chemical route for making porous mullite ceramic parts in near net shape from preformed precursors. The invention entails heating a mixture of finely powdered aluminum fluoride and silicon dioxide in a molar ratio of approximately 12:13, along with a binder. The reactants form mullite according to the reaction:

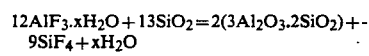

At temperatures above about 890° C. this reaction results in the formation of mullite whiskers. If the reactants are mixed at room temperature and subjected to gradual heating, most organic binders can be expected to decompose at much lower temperatures and will break down and evaporate before the inorganics react. Topaz ($Al_2 SiO_4 F_2$) may then form as an intermediate product when the temperature reaches range of from about 700°–800C. Topaz conversion in mullite will commence at about 890° C., the result being an essentially unitary mullite product.

In any event, the above reaction is set forth for purposes of illustrating the stoichometry involved in selection of the reactant ratio. Product composition and distribution may vary, gaseous products other than silicon fluoride and water may evolve and other intermediates may form and decompose. The basic reaction of aluminum fluoride with silicon dioxide in a ratio of 12:13 at a temperature above about 890° C. will, however, result in the formation of mullite whiskers according to the present invention.

It has been found that a particularly useful, dense mullite whisker composition can be prepared by first preparing topaz from a near stoichometric mixture of aluminum fluoride and silicon dioxide, which mixture is heated to form topaz. The topaz so prepared may then be blended with a near stoichometric amount of silicon dioxide, formed to near net shape with a binder and further heated to form a near net shape article composed of mullite whiskers. This topaz route to mullite formation is particularly suitable for use in forming mullite whisker honeycombs.

In some cases it is desirable to conduct a first reaction of aluminum fluoride with silicon dioxide to form topaz, as described above, and to use the intermediate topaz as an added reactant in a subsequent aluminum fluoride/silicon dioxide reaction for the production of mullite.

In the practice of the present invention, the reactants are mixed thoroughly with a suitable binder, such as, e.g., a Methocel solution(a methyl cellulose marketed by Dow Chemical Co.). Other suitable binders include, e.g., alginates, polyethylene oxides, resins, starches, guar gum and waxes. Choice of suitable binders for ceramics is discussed in U.S. Pat. No. 4,551,295 which is incorporated herein by reference. Following mixing with a binder the reactants are formed into a desired shape using extrusion, injection molding, low pressure injection molding, pressing, tape casting or any other suitable ceramic processing technique.

In carrying out the invention formed pieces of the powdered reactants and binder are fired to a desired temperature (900° C. and above) in either a neutral, oxidizing or reducing atmosphere and, while the original shape is retained, the precursor mix is transformed to mullite. There is no matrix, and the product is in the form of very porous shaped articles comprised of interconnecting mullite whiskers.

Inherent in this method of manufacturing mullite is the possibility that the fired articles may contain trace amounts of fluoride ions. Since even very low concentrations of fluoride ion can poison many catalysts, it is important that the formed mullite articles be essentially fluoride-free, if they are to be used as support for metallic catalysts. One aspect of the present invention involves preparation of mullite articles by the described route, and obtaining such articles in a fluoride-free condition. Practical methods of fluoride ion removal include the use of steam or superheated steam. For example, a honeycomb useful for the support of metallic catalyst can, after it is fired, be immersed in a superheated (900° C.) concentrated sulfuric acid bath and/or have steam passed therethrough to remove fluoride ion. Alternatively, a hydrogen purge is an efficient remover of fluoride ion. The result is an essentially fluoride-ion-free mullite honeycomb support.

The method of making porous mullite articles described here is especially attractive because by this route shaped articles with very high thermal shock resistance can be produced at comparatively low cost. The articles are light weight and have very high creep resistance. According to the invention, articles with complex or thin shapes can be produced with relative ease. Examples are honeycomb shapes, corrugated sheets, reticulated (comb-shaped) pieces, foams, donuts or any other desired functional shape chosen to serve as a filter, catalytic substrate, particulate trap or other functional purpose. These articles can be made into a near net-shape and/or machined extensively without cracking. Catalytic substrate walls with high roughness can be produced, and high specific strength (strength/density) mullite articles attained without any residual glassy phase present.

Refractory catalyst supports such as those described in U.S. Pat. No. 3,565,830 (incorporated herein by reference) constitute a particularly advantageous utilization of the present invention. Mullite supports prepared according to the present invention may be readily coated with catalytically active oxide, such as alumina, and then impregnated with a platinum group metal for use with catalysts such as those described in the reference patent.

Refractory catalyst supports are also required for process directed to catalytically supported thermal combustion described for example in U.S. Pat. No. 3,928,961 (incorporated herein by reference). Mullite catalyst supports made according to the present invention are exceptionally well adapted for use in catalytic combustion process such as those described in this latter patent.

Two articles made by the precursor mix according to the present invention can be joined to each other via thermal treating. Preparing a good joint between two similar materials has advantages. Certain catalytic applications require large size of honeycomb pieces. A diesel particulate filter can be about 12 inches in diameter or more. A large piece of honeycomb shaped article is required for catalytic combustion applications. Extrusion of such large pieces is very difficult. Since the joint between two articles made from this material has good quality then large pieces can be assembled by joining smaller extruded parts. For example, a cylindrical honeycomb material can be assembled by fusing four pieces of quadrant cylinders. In this method, several small pieces of green particulate aluminum fluoride, silicon dioxide and binder admixture are joined either by placing in integral contact or pressing smaller unfired pieces together before firing, so that upon firing large articles of relatively more complex shapes are formed.

The pure mullite ceramic of the present invention has a very high melting point (>1880° C.) and production of articles composed of whiskers is an especially straightforward and clean process, since there is no need to disperse mullite whiskers, the whiskers being formed during heating of the shaped article made of the precursor mix. Thus avoiding health and safety problems associated with respirable whiskers.

The degree of porosity can be controlled by adding either mullite whiskers or densifying agents such as kaolin-based clays, aluminum oxide or any aluminum silicate to the charge. Mullite whiskers for use in such an addition can be obtained by milling any shape produced by the route described in this disclosure. These whiskers, when added to the charge composed of aluminum fluoride, silicon dioxide and suitable binders, remain unreacted during conversion of the charge to mullite at temperatures of 900° C. and above and increase the density of the final piece and reduce its total porosity. A variation of porosity through the thickness of an article can be controlled by putting separate layers of charges with different initial mullite concentration adjacent to each other when the particular ceramic forming process can be adapted to permit this application. Further porosity control can be obtained by adding graphite to the reactant mix. The graphite will burn off below the mullite formation temperature, resulting in increased porosity.

Clay can also be used in small amounts to improve the extrudability of the honeycomb. Clay is more plastic than either silica or aluminum fluoride. The increased plasticity of the extrudate mix which accompanies clay addition enhances the ease of extrusion. Such clay can be added to the dry mix or entrapped in the binder solution. Suitable clays include, for example, bentonite, attapulgite, palygorskite, montmorillonites, pyrophyllite and kaolin.

A further aspect of the invention involves improving the strength of mullite articles by grinding the reactants prior to conversion to mullite. In particular, grinding of reactants to particle sizes of less than about 45 microns can improve the compression strength of the mullite articles produced therefor by about a factor of two (2). Such grinding or particle size reduction can be conducted by a variety of methods, ball milling being one of the more convenient well known methods.

Finally, as is appreciated by those skilled in the art, whisker processing has the potential for creating serious health hazards. In the manufacturing route of the present invention whiskers are formed in-situ from powders at elevated temperatures and remained interconnected. Thus, there is no need to handle loose whiskers during the manufacture route which is the subject of the instant invention.

BRIEF DESCRIPTION OF THE DRAWINGS

The invention can be further understood by reference to the drawings in which.

To illustrate more completely the invention, the following examples are given. These examples are for purposes of illustration only and are not to be construed as limitations of the invention.

EXAMPLE 1

254 grams of aluminum fluoride from a commercial source (Aldrich $ALF_3 \cdot 2.8\ H_2O$) was weighed. The aluminum fluoride was then added to 123 grams of −325 mesh amorphous silica (Thermal American, Montville, N.J.) and ground and mixed in a ball mill for 24 hours. The mix was then placed in a pug mill where 120 ml of 7% Methocel solution was slowly added to the batch during mixing. The mixing continued until an extrudable plastic mass was obtained. The charge was then fed to the extrusion chamber and extruded through a simple honeycomb die and shapes of approximately 1 ½" diameter and 2" length were formed. The cell density of the pieces were approximately 11 cells/square inch.

A number of such extruded pieces were placed in an oven at 75° C. so that the Methocel binder gelled. Then the pieces were placed in a nitrogen flowing tube furnace and heated at a rate of 10°C./min until 350° C. was reached. The pieces were soaked at this temperature for one hour and heated at a rate of 10° C./min until 1000° C. was reached. The samples were then furnace cooled, with room temperature being obtained over the course of several hours. The appearance of these samples (referred to herein as 1(a)) was porous, strong enough to handle without breaking, cohesive, integral and dark grey in color.

One sample was reheated to 1000° C. at a rate of 8° C./min, followed by heating it to 1300° C. at a rate of 5° C./min. The honeycomb piece was held at this temperature for 6 hours. Finally, the piece was cooled from this temperature to room temperature at a rate of 25° C./min. This honeycomb (referred to herein as 1(b)) appeared white, extremely porous, cohesive, integral, strong enough to handle without breaking and very lightweight. The initial and final weights of the honeycomb were 26.13 and 8.42 grams, respectively.

One piece prepared as in example 1(b) was thermal shocked in a gas fired furnace from 1000° C. to 600° C. at a rate of 25° C./sec. Visual examination showed no evidence of cracking. The same piece was subsequently shocked from 1100, 1200, 1300 and 1400° C. to 600° C. at the rates of 23.8, 25, 25.9, 26.7° C./sec, respectively. After each shock the piece was visually examined and no cracking was observed. Two three-point flexural beams were cut from this piece. The strength of each beam was measured using Instron equipment (Model 4202) at a crosshead speed of 0.0075 in/min. The strength of the porous honeycomb specimens with two cells in width and one cell thickness was measured as 111 psi. The apparent density of the honeycomb wall was measured as 0.48 gr/cc.

Figure 1:
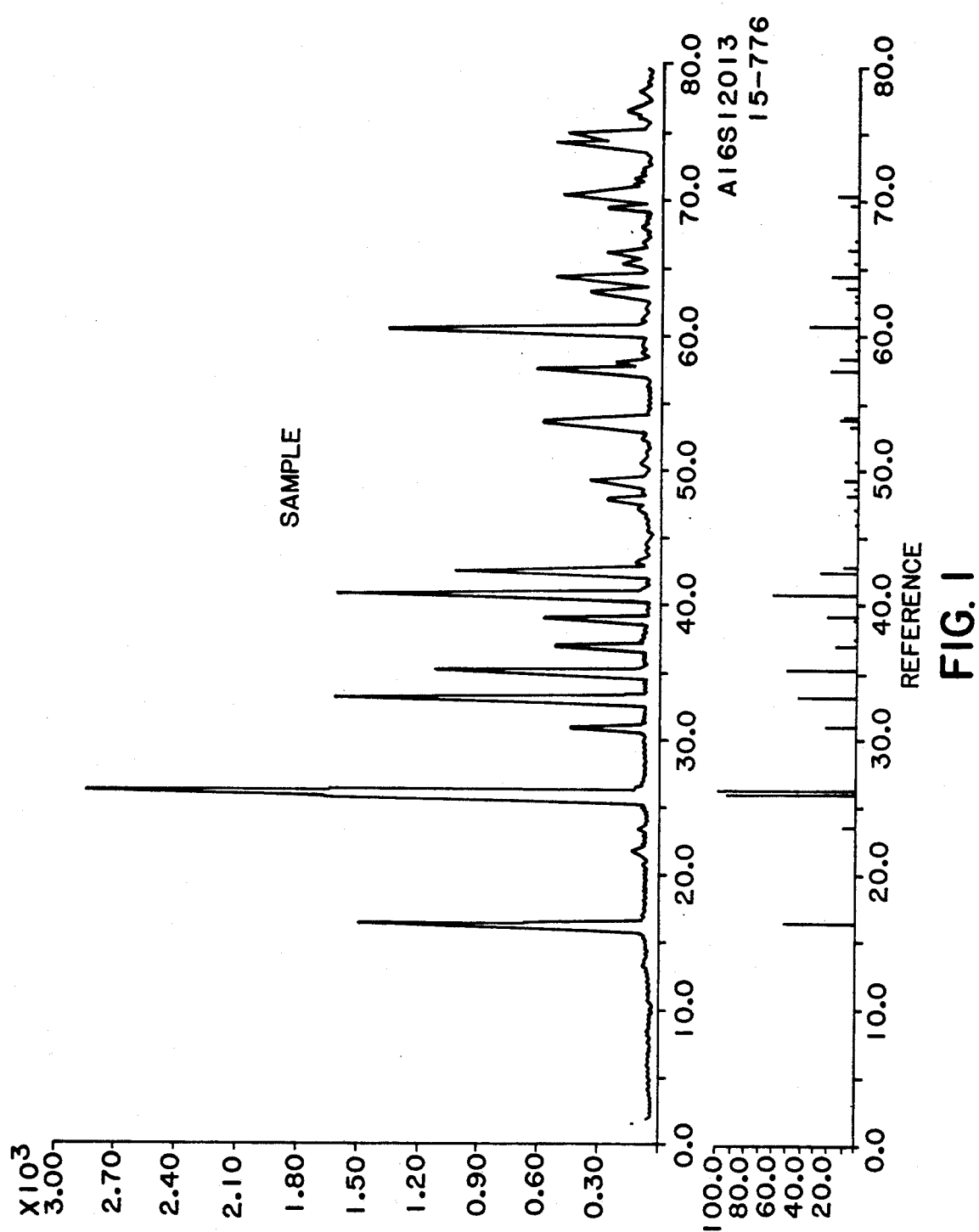
FIG. 1 is an X-ray diffraction pattern of a specimen prepared according to the invention.

The X-ray diffraction (XRD) pattern of the honeycomb material is shown in FIG. 1. No evidence of glassy phase was observed. The material as is evident from this pattern is very crystalline mullite. Chemical analysis done using EDX analysis showed the whiskers have substantially a mullite composition (40.0% Al, 11.4% Si and 48.6% O).

Figure 2:
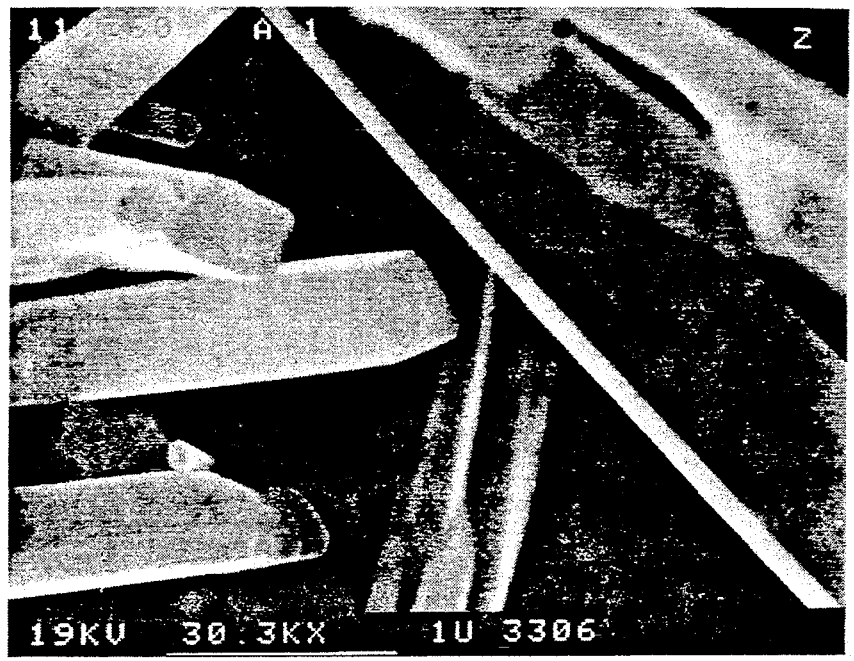
FIG. 2 is a scanning electron micrograph of the surface of a specimen prepared according to the invention.
Figure 3:
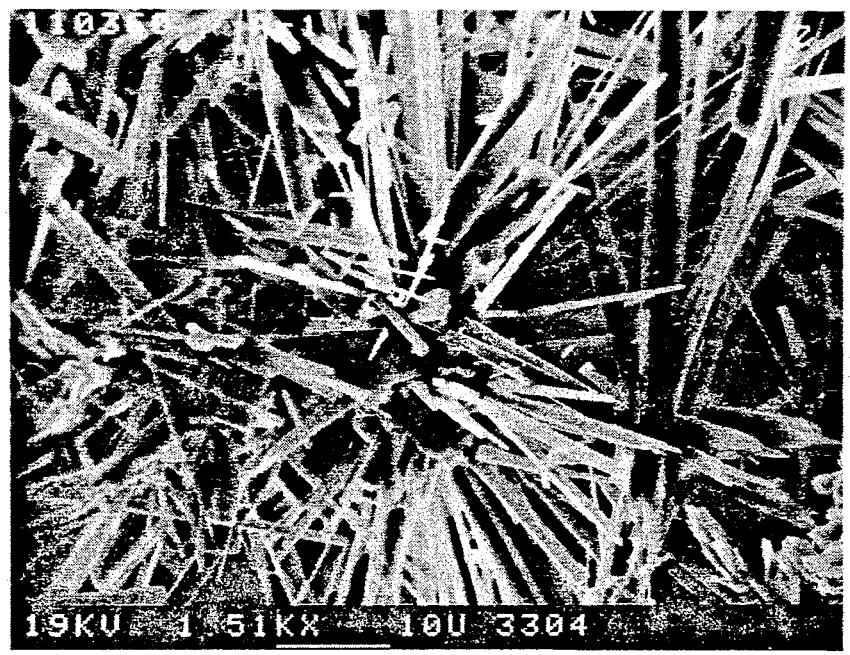
FIGS. 3 and 5 are micrographs of material prepared in accordance with the present invention.
Figure 4:
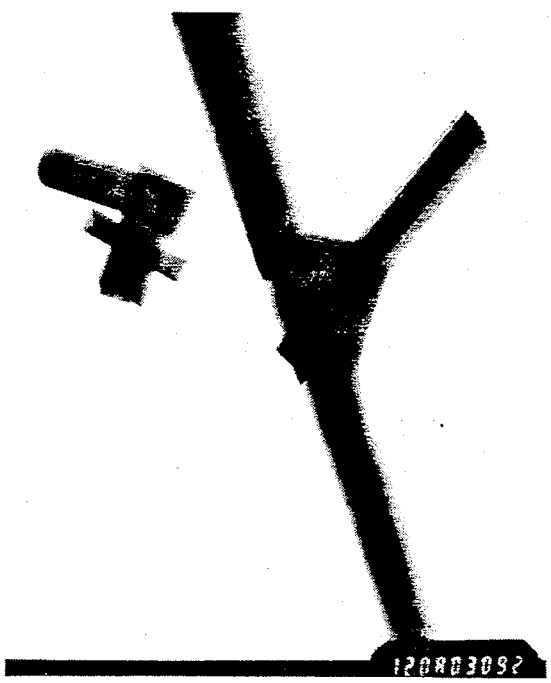
FIG. 4 is a micrograph depicting a joint formed between two pieces of mullite whisker material.

The scanning electron micrograph (SEM) of the fracture surface reveals the microstructure of this material as shown in FIG. 2. The material is basically an open 3-dimensional whisker structure, with interconnected whiskers of sizes range from 0.05 to 10 microns or larger in diameter. Individual whiskers appear to be very crystalline with very smooth surfaces, FIG. 3. The transmission electron micrograph of the whiskers showed that they are branched and interconnected with very clean boundaries, exhibiting very little or no glassy phase at the site of interconnection, FIG. 4.

The honeycomb pieces were machinable. Four holes were drilled using a electric drill with a 3/32 drill bit. The holes were ¼" apart from each other. There was no apparent cracking around the holes.

EXAMPLE 2

Discs of green material composed of aluminum fluoride, silica, Methocel and water were dry pressed into forms 13 millimeter in diameter with heights varying between 5 to 9 millimeters. The $AlF_3/SiO_2$ ratio was kept at 2/0.968. The discs were fired in flowing nitrogen at 1400° C. Compression strength of the discs was evaluated using a screw driven Instron equipment (Model 4202) at a crosshead speed of 0.0075 in/min. The average strength was obtained as $310\pm56$ psi. 1200° C., 1300° C. and 1400° C. of $306\pm49$, $243\pm31$ and $220\pm37$ psi, respectively.

EXAMPLE 3

Aluminum fluoride and silica powders each with top sizes of 45 microns were ground separately in anhydrous ethanol in an Eiger mill using zirconia ball media. Handling of aluminum fluoride in a water-free environment at this point is important in order to maintain a flowable powder. The powders were then ground to less than 10 microns and oven dried and in a molar ratio of 12:13 and mixed in ethanol in the above described Eiger mill. No ball media was used. The stoichiometric mixture was then oven dried. Methocel in the form of 0.2% solution was manually added to the mix. Discs were formed, dried in an oven then fired in flowing nitrogen at 1400° C. Room temperature compression strength of these discs was $667\pm41$ psi. The described pregrinding of the reactants, which resulted in initial powders finer than 45 microns, thus improved the strength of the porous mullite discs.

Backpressure measurements on these discs were performed by flowing nitrogen through them. Back pressures were measured using a differential pressure gauge placed in parallel to the sample disc. Flow rate of the incoming gas was carefully monitored. Backpressure increased as the flow rate increased. As expected, thicker samples showed higher back pressures. The permeability coefficient of the filter material was calculated using Darcey's equation. Its value was determined as $3.86\pm1.12$ $(x10^{-13})$ $m^2$.

EXAMPLE 4

Figure 5:
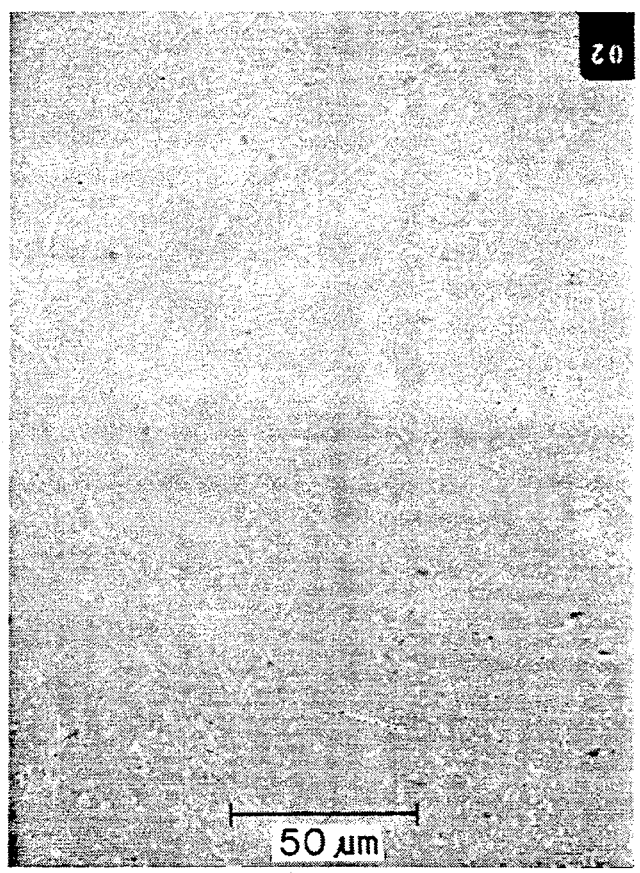

Aluminum fluoride and silica powder were ground and discs were prepared as described in Example 3. Two discs were placed on top of each other and fired in flowing air at 1400° C. FIG. 5 shows the interface between the two discs after firing. The joint zone is approximately 20 microns. The darker color background is epoxy used in sample preparation for microscopy. Whiskers grew from each disc and joined the two discs. The joint appears uniform and no glassy phase is apparent at the boundary.

EXAMPLE 5

An alumina fluoride, silica, Methocel mixture was prepared as described in Example 3, extruded through an 11 cell/square inch die to form a honeycomb and fired in flowing nitrogen 1400° C.

A mullite precursor sol mixture was then prepared using 15 grams of a 26% silica and 4% alumina sol mixture (NALCO ISJ-612) and 93.3 grams of a 10% alumina sol (NALCO-ISJ-614). The sol mixture was stirred for four days using a magnetic stirrer. The honeycomb piece was then dipped in the sol mixture twice, dried at 120° C. and dipped twice again followed by drying at 120° C. The honeycomb was then fired to 1400° C. and weighed upon cooling. A weight gain of 10% was noted. Repeated examples showed weight gains of up to 20% or more, demonstrating that densification of fired honeycombs could be easily achieved.

EXAMPLE 6

Two sample geometries of mullite whisker material were prepared. These were simple honeycombs (1.5 inch dia., with 11 cells/square inch) and discs (13 mm dia.). The apparent density of the mullite whisker composite is 0.5 g/cc. Lighter samples were prepared to observe the effect of porosity on key parameters such as strength and backpressure. These samples were prepared by adding graphite into the mix, the graphite burning off at a temperature range of 600-800° C. resulting in increased porosity.

i) Strength

Figure 6:
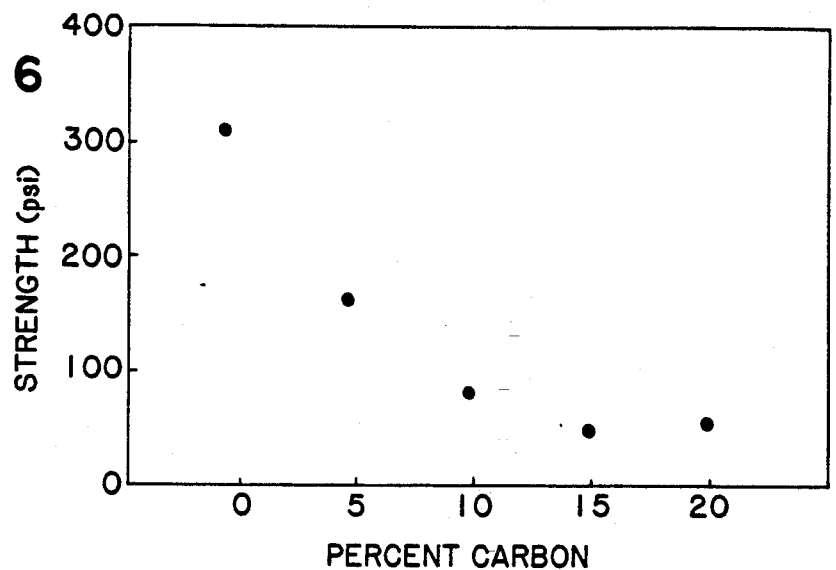
FIG. 6 is a plot of compression strength of a mullite whisker article vs. carbon content of reactants.

Several discs (13 mm dia.) were prepared by dry pressing. Samples were heat treated in nitrogen at 1300° C. for 12 hours. The average compressive strength of the fired discs was 310 psi. The specific strength (strength/density) was 16610 inches. Samples with greater porosity, prepared using graphite, had less strength as illustrates in (FIG. 6).

ii) Durability

Figure 7:
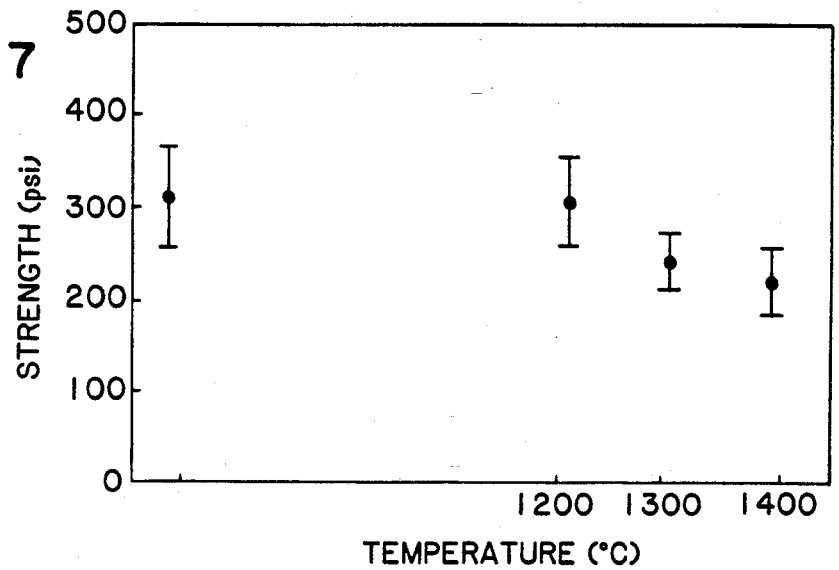
FIG. 7 is a plot of compression strength vs. temperature for mullite whisker articles.
Figure 8:
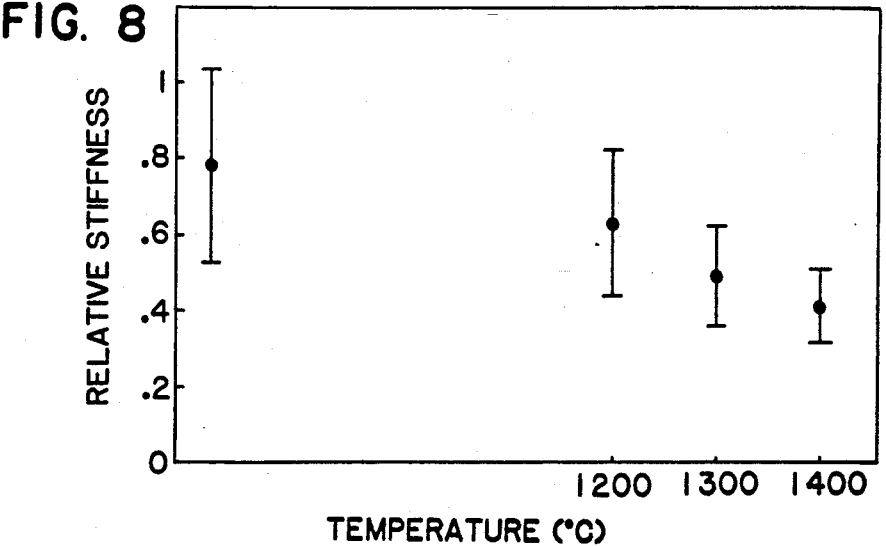
FIG. 8 is a plot of relative stiffness vs. temperature for mullite whisker articles.

Strength as a function of testing temperature is shown in FIG. 7. Room temperature strength was maintained at 1200° C. A 10% drop was observed at 1300° C. At 1400° C. strength was 220 psi, only 25% less than obtained at room temperature. The material was still quite usable at this temperature. FIG. 8 shows relative stiffness of the discs as a function of testing temperature. These values were obtained by measuring the slope of the elastic portion of the load vs. time curves.

iii) Thermal Shock Resistance

One honeycomb piece, fired at 1300° C., was thermally shocked in a gas fired furnace from 1000° C. to 600° C. at an approximate rate of 25° C./sec. Visual examination showed no evidence of cracking. The same piece was subsequently shocked from 1100, 1200, 1300 and 1400° C. at the same rate to 600° C. After each shock, the piece was visually examined and no cracking was observed. A second honeycomb was shocked from 1300° C. for 5 cycles at a rate of 25° C./sec and ultimately failed. The XRD analysis showed that this piece had cristobalite in it which is expected to be detrimental because of high temperature phase transformations. More severe thermal shock experiments were done with other honeycomb samples. One sample survived water quenching from 1100 and 1300° C. at an approximate rate of 280° C./sec. Minor spalling was observed along the circumference of the cylinder.

EXAMPLE 7

A commercial kaolin-based clay (Satintone #5, a fine particle size calcined kaolin, marketed by Engelhard Corporation) was mixed with $AlF_3$ powder (5.52 grams $AlF_3$, 1.80 grams $SiO_2$, 2.22 grams clay and 0.48 gram Methocel ) pressed into a pellet and fired in nitrogen to 1300° C. XRD results showed that the final product was principally mullite, alpha-alumina and a minor amount of cristabalite. Since the presence of cristabalite may impair thermal shock resistance, it may be advantageous to compensate for the excess silica in the fired product by adding alumina powder or aluminum fluoride to the initial powder mix and thereby obtain 100% mullite composition.

EXAMPLE 8

Thirteen grams of a commercial fine particle size hydrous kaolin (Engelhard ASP -172) was added to 465 ml water in a beaker. The beaker was then heated to 90° C. followed by transferring of the contents to a blender in which the mixture was stirred at low speed. Dry Methocel powder, 65 gram, was added to prepare a 14% methocel solution and the mixture chilled and refrigerated.

Aluminum fluoride and silica powders, 297.5 and 143.9 grams, respectively, were mixed in a ball mill jar and blended overnight, the dry fluoride/silica mixture pug milled, 145.2 grams of the above described Methocel solution being added during milling. After 30 minutes of pugging, the mixture was extruded to a honeycomb shape of approximately 50 cells per square inch using a piston extruder. This mixture was softer and far more easily extruded than those extruded without clay addition to the Methocel mixture. Clay addition reduced the amount of water needed to extrude a cohesive, integral piece.

EXAMPLE 9

A piece of cordierite material, which is a conventional catalyst support with proven compatibility/utility with precious metal/platinum group metal catalyst, was crushed and ground to a fineness of −325 Mesh. Mullite discs of 13 mm in diameter prepared in accordance with the present invention were crushed to the same fineness. Three grams of mullite and cordierite were weighed and kept separately. Deionized water was added to both powders to observe the amount of water needed to partially wet each powder. Incipient wetness was achieved for mullite and cordierite at 37 and 37.7% water loading, by weight, respectively. Incipient wetness formulations were prepared at about 37% for both materials in the following examples.

Five grams of cordierite and mullite powders were weighed and kept separately. 0.33 gram of a platinum salt solution was weighed in two separate beakers. This amount was chosen to yield 1% Pt in 5 grams of solid. Water in an amount of 1.55 grams was added to each beaker. The diluted platinum solution was then added to the mullite and cordierite powders under constant stirring. These mullite and cordierite powder samples with their platinum loadings were then dried in an oven at 100° C. overnight, and were labeled A and B respectively.

This procedure was then modified to include a washcoat along with the cordierite and mullite. To accomplish this 1.0 gram of aluminum nitrate $(Al(NO_3)_3)$ was weighed in two separate beakers. One gram of deionized water was added to each beaker and stirred until the aluminum nitrate dissolved. In each of two other beakers was placed approximately 5 grams of −325 Mesh mullite and cordierite. The aluminum nitrate solution was then added to each powder. The mixtures were then placed in a drying oven at 450° C. for two hours. This procedure is known to convert aluminum nitrate to alumina. The resulting solid contained 5% alumina in both systems, which effected a washcoat of alumina on the mullite and cordierite. Pt solutions were then slowly fed to the baked powders followed by drying of incipiently wet mixtures at 100° C. overnight. These samples were labelled C for the washcoated mullite and D for washcoated cordierite.

The following treatments were then done to each of samples A,B,C,D. Each sample was heated to 750° C. and heat soaked for 12 hours. A 0.1 gram specimen was removed from each sample on which to conduct a catalytic activity test. Each such specimen was reduced with flowing hydrogen before the activity test.

The catalytic activity tests were made by monitoring conversion of CO to $CO_2$. Carbon monoxide and oxygen gases, in a 2 to 1 molar ratio, were passed into a reactor while the catalyst samples were heated at a rate of 2° C./min. Samples of gas were analyzed at every 10° C. interval using a $CO_2$ analyzer (Beckman Model 868) and an Infrared Industries CO analyzer (Model 702). The temperature at which 50% of carbon monoxide was converted to carbon dioxide, $T_{50}$, was 237 and 253° C. for mullite and cordierite, respectively. For the washcoated samples, $T_{50}$ values are 275 and 262° C. for mullite and cordierite, respectively.

EXAMPLE 10

Figure 9:
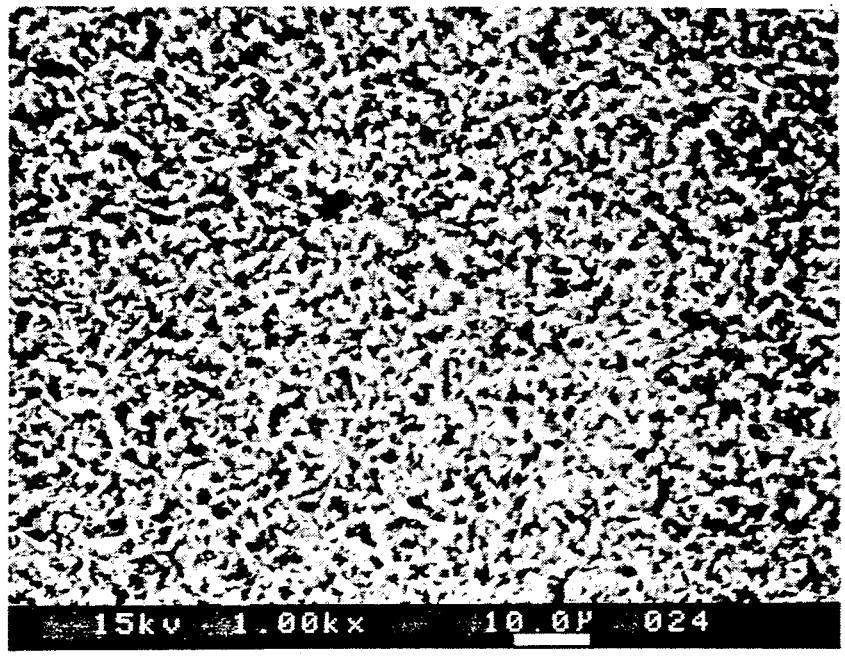
FIG. 9 is a micrograph of the structure of a honeycomb produced from the topaz route.
Figure 10:
FIG. 10 is a micrograph of the structure of a honeycomb produced directly from aluminum fluoride and silica.

A quantity of 348.5 grams of aluminum fluoride trihydrate was mixed with 151.5 grams of amorphous silicon dioxide in a pug mill. To this mixture, 21.6 grams of Methocel was added. The mix was pugged for 15 minutes. A total of 130 mls. deionized water was added to the mix. Pugging continued for 30 more minutes. The paste was then extruded through a multiple die with 1/16" openings using a piston extruder to spaghetti shape. The extrudates were then fired in air at 750° C. for 12 hours. Weight loss upon firing was 52%. The XRD analysis showed that the fired product was topaz. A total of 441 grams of topaz was prepared as described above and mixed with 24 grams of silicon oxide in a ball mill with liquid medium being ethyl alcohol. After being ball milled 24 hours, the mixture was filtered and dried. The dried mixture was mixed with 23 grams of Methocel 20-213 and mixed dry in a pug mill. A total of 140 mls. of water was added to produce an extrudable paste. The mix was then extruded through a 50 cpsi 1.5" die to a honeycomb shape using a piston extruder. The honeycomb pieces were then fired to 1400° C. to produce mullite. The final extrudate was stronger than that obtained by extruding aluminum fluoride and silica alone. FIGS. 9 and 10 show the microstructures of this topaz produced honeycomb and one obtained by firing aluminum fluoride with silica alone, respectively. The interconnected whisker network present in the material produced by the topaz route of this example is shown therein to be denser.

EXAMPLE 11

A topaz/silica mixture was prepared as described in Example 10. Polyethylene glycol was added to the dry mixture less than 1% by wt. A total of 5% by wt. Methocel was added as binder. A total of 110 ml. water was added to produce extrudable paste. The mix was then extruded and fired as described in Example 10. The appearance and properties of the honeycombs were same as described in Example 1. The weight lost on firing was 35%.

EXAMPLE 12

A dry mix was made by blending 249 grams of aluminum fluoride trihydrate, 120 grams of silicon oxide and 71 grams of topaz prepared as described in Example 10.

Methocel binder, 26 grams, was added to the dry mix. A total of 107 mls. of water was added and pugged for 40 minutes. The mix was then extruded to a honeycomb shape through a 50 cpsi die via a piston extruder. The extrudates were then fired at 1400° C. in air. Weight loss of 55% was observed upon firing. The resulting extrudates were all composed of interconnected mullite whiskers, of which 30% were generated by the reaction of topaz and silica. The rest of the whiskers were formed by the reaction of aluminum fluoride and silica.

EXAMPLE 13

A four component dry powder mix was blended in a pug mill. The mix was composed of 249 grams of aluminum fluoride, 120 grams of fused silica, 71 grams of topaz and 22 grams of Methocel. Polyglycol was added to the mixture. A water volume of 91 mls. was added to the mix and pugged for 45 minutes. A second batch was made following the same procedure to double the size of the paste. Both batches were fed to a twin screw extruder and honeycomb pieces with 64 cpsi and 2"×2" were extruded. Some of the extrudates were air dried while others were dried in a conventional kitchen type microwave oven at medium heat. Microwave dried pieces appeared to be smoother on the outside surfaces with less cracks. Some pieces were heated in the microwave in the presence of water vapor which was generated by water present in a one liter beaker located inside the microwave cavity. These pieces had the best appearance on the outside and had the least number of flaws on the outside. The pieces were then fired at 1400° C. to have the same composition as described in Example 12.

EXAMPLE 14

A total of 24.4 lbs. of aluminum fluoride was blended with 15.7 lbs. of topaz in a sigma mixer. This mix was fed dry via a loss-in-weight type feeder to a co-rotating twin screw extruder at a rate of 73.8 lbs/hr. A mixture of silica and Methocel was fed at a rate of 26.2 lbs/hr simultaneously. A water/glycol mixture (2.7% glycol) was also independently fed to the extruder. The powders and liquid were mixed and conveyed through the chilled barrels of the extruder and thru a 2"×2" 64 cpsi honeycomb die. The extrudates were then sliced to various lengths and dried either in air or in microwave oven in the presence of water vapor as described in Example 13. The extrudates did not show cracking on the outside surfaces and fired to form interconnected mullite whiskers, of which 50% was generated by the reaction of topaz and silica.

EXAMPLE 15

A quantity of 9.6 grams of topaz and 0.4 grams of Methocel powder was mixed with 1.92 grams of colloidal silica containing 50% silica by weight. Water was added gradually so that the paste had 21% water. The mix was then pressed to 1.25" diameter discs at a pressure of 5000 psi at 80° C. The discs were then fired and cut to make bend bars with approximately 6.8×3.3 mms. cross section. The bars were tested for strength by three point bending tests and their strength varied between 7000-9000 psi. Strength of the material made using colloidal silica was higher by 2000-3000 psi than that made by amorphous powder silica.

EXAMPLE 16

A total of 450 grams of aluminum fluoride, silica and topaz was blended at the same ratio as used in example 14 in a sigma blade pug mill. To this mixture water/glycol mixture was added 2.7% glycol and the mixture was pugged until a paste suitable for extrusion was obtained. The paste was then pressed through a 50 cpsi die using a ram press to obtain honeycomb shaped profiles of 1.5" diameter. The pieces were then dried and fired at a temperature of 1400° C. for full conversion of reactants to mullite. One piece was then coated with a standard commercial precious metal containing autocatalyst. The piece was then dried and calcined to observe adhesion of catalyst to the substrate. The washcoat adhered to the substrate uniformly after calcining. The piece was then tested for catalytic activity for $C_7H_{16}$ oxidation, $SO_2$ to $SO_3$, CO to $CO_2$, and NO to $NO_2$ using a diagnostic reactor. The results of the conversion are listed below:

| Species | Conversion Rate |
| --- | --- |
| $C_7H_{16}$ oxidation | 37% |
| $SO_2$ to $SO_3$ | 23% |
| CO to $CO_2$ | 62% |
| NO to $NO_2$ | 3% |

These results demonstrate that mullite whisker honeycombs can be coated with commercial precious metal based washcoats with catalytic activity in the catalyzed substrates.

These results further demonstrate that the mullite material is as effective as cordierite in providing support to a precious metal catalyst species, and particular advantages can be obtained from using the described topaz preparation procedure.

Various changes and modifications can be made in the process and products of this present invention without departing from the scope and spirit thereof. The various embodiments disclosed herein are for the purpose of further illustrating the invention but are not intended to limit it.

What is claimed is:

1. A process for forming a shaped article comprised of mullite whiskers comprising the following steps:
   a. preparing a mixture of aluminum fluoride and silicon dioxide in a weight ratio of about 7:3;
   b. firing the mixture in air at a temperature above about 750° C. until complete conversion to topaz takes place;
   c. mixing the topaz product of step (b) with silicon dioxide in a weight ratio of about 18:1 together with a binder and firing at a temperature of above about 1400° C. until substantially complete conversion to mullite occurs.

2. A process according to claim 1 wherein the binder is at least one selected from the group consisting of methyl cellulose, alginate, polyethylene oxide, resin, starch, guar gum, wax and clay.

3. A process according to claim 1 wherein the binder is an aqueous solution of methyl cellulose.

4. A process according to claim 1 further comprised of adding additional aluminum fluoride to the aluminum fluoride silicon dioxide mixture in order to compensate for the presence of silica in the clay.

5. A process according to claim 1 wherein the aluminum fluoride and silica reactants have an average particle size of less than about 45 microns.

6. The process of claim 1 wherein the mixture of aluminum fluoride and silicon dioxide further comprises mullite whiskers.

7. The process of claim 1 wherein the mixture of aluminum fluoride and silicon dioxide also contains graphite.

8. The process of claim 1 further comprised of adding to the topaz, silicon oxide mixture of step (c) a mixture of aluminum fluoride and silicon dioxide in an amount stoichometric for the preparation of mullite is added prior to firing.

9. The process of claim 1 wherein the ratio of aluminum fluoride to silicon dioxide present in step (c) is selected such that the resulting shaped article has a porosity of from 15-85%.

10. A process according to claim 1 wherein the topaz and silicon oxide reactants and binder of steps (c) are extruded through a die to form a near net shaped preformed honeycomb prior to reaction to mullite, such that a resulting mullite whiskers honeycomb is a porous, thermal shock and creep resistant support suitable for use as a particulate trap or a catalytic combustor.

11. A process according to claim 10 further comprised of depositing a precious metal catalyst on the honeycomb.

12. A process according to claim 11 further comprised of washcoating the mullite honeycomb with a catalytically active refractory oxide prior to the deposition thereon of a precious metal catalyst.

13. A process according to claim 10 wherein the mullite honeycomb is made fluoride ion free by treatment with superheated steam.

14. The process of claim 11 further comprised of adding clay to the reactants prior to extrusion.

15. A process according to claim further comprised of densifying the shaped article by immersion in a mullite precursor sol mixture, drying and fired at a temperature in excess of 890° C.

16. A honeycomb comprising porous mullite whiskers prepared from the reaction of topaz and silicon dioxide, wherein the topaz and silicon dioxide are held together with a binder and extruded to form a honeycomb prior to firing at a temperature above about 1400° C.

17. A honeycomb according to claim 16 which has been rendered fluoride-free by treatment with an agent selected from the group consisting of hydrogen and steam.

18. A honeycomb according to claim 16 which has been prepared using a binder comprising methyl cellulose and clay.

19. A honeycomb according to claim 16 further comprised of a precious metal deposited thereon.

20. A honeycomb according to claim 16 further comprised of a catalytically active refractory oxide deposited thereon.

* * * * *